(12) United States Patent
Lallukka

(10) Patent No.: US 10,569,366 B2
(45) Date of Patent: Feb. 25, 2020

(54) METHOD AND A PLATE MODULE FOR MANUFACTURING A THERMAL MODIFICATION KILN

(71) Applicant: LUXHAMMAR OY, Mikkeli (FI)

(72) Inventor: Tero Lallukka, Mikkeli (FI)

(73) Assignee: Luxhammar Oy, Mikkeli (FI)

( * ) Notice: Subject to any disclaimer, the term of this patent is extended or adjusted under 35 U.S.C. 154(b) by 360 days.

(21) Appl. No.: 14/895,278

(22) PCT Filed: Apr. 30, 2014

(86) PCT No.: PCT/FI2014/050315
§ 371 (c)(1),
(2) Date: Dec. 2, 2015

(87) PCT Pub. No.: WO2017/177768
PCT Pub. Date: Nov. 6, 2014

(65) Prior Publication Data
US 2016/0107266 A1 Apr. 21, 2016

(30) Foreign Application Priority Data

May 2, 2013 (FI) ...................................... 20135453

(51) Int. Cl.
| | | |
|---|---|---|
| F26B 25/06 | (2006.01) | |
| B23K 31/02 | (2006.01) | |
| B23K 11/08 | (2006.01) | |
| B23K 11/11 | (2006.01) | |
| F26B 9/06 | (2006.01) | |

(52) U.S. Cl.
CPC .............. *B23K 31/02* (2013.01); *B23K 11/08* (2013.01); *B23K 11/11* (2013.01); *F26B 9/06* (2013.01)

(58) Field of Classification Search
CPC . B23K 11/08; B23K 11/11; F26B 9/06; F26B 25/14; F26B 25/06; F26B 25/10; F26B 25/12
USPC .................................................... 34/201, 202
See application file for complete search history.

(56) References Cited

U.S. PATENT DOCUMENTS

| | | | | |
|---|---|---|---|---|
| 1,741,342 A | * | 12/1929 | Schwartz | ................ F26B 25/08 52/578 |
| 1,741,366 A | | 12/1929 | Hurxthal | |
| 4,021,928 A | * | 5/1977 | Johnson | ................... A24B 1/02 131/302 |

(Continued)

FOREIGN PATENT DOCUMENTS

| | | |
|---|---|---|
| EP | 0127545 | 12/1984 |
| EP | 0612896 A1 | 8/1994 |

(Continued)

OTHER PUBLICATIONS

International Search Report, dated Sep. 2, 2014, from corresponding PCT application.

(Continued)

*Primary Examiner* — John P McCormack
(74) *Attorney, Agent, or Firm* — Young & Thompson

(57) ABSTRACT

A method for manufacturing a thermal modification kiln for timber includes making plate modules from steel plates (200) by forming edges (210, 220, 230, 240) of the plates with flaps (211, 213, 215, 221, 223, 225, 231, 233, 235, 241, 243, 245), which enable adjacent modules to be interconnected for constructing a kiln frame.

12 Claims, 4 Drawing Sheets

(56) References Cited

U.S. PATENT DOCUMENTS

| | | |
|---|---|---|
| 5,447,003 A | 9/1995 | Warren et al. |
| 6,061,987 A | 5/2000 | King |
| 2005/0166838 A1* | 8/2005 | Smith ................... E04B 1/08 118/326 |
| 2006/0144002 A1 | 7/2006 | Charlwood |

FOREIGN PATENT DOCUMENTS

| | | |
|---|---|---|
| EP | 0 867 674 A2 | 9/1998 |
| EP | 0 957 324 A1 | 11/1999 |
| FI | 54524 C | 12/1978 |
| FI | 4046 U | 7/1999 |
| FR | 932613 A | 3/1948 |
| GB | 791706 A | 3/1958 |
| JP | 2002145383 A | 5/2002 |

OTHER PUBLICATIONS

FI Search Report, dated Feb. 5, 2014, from corresponding FI application.

Supplementary European Search Report issued in Application No. 14792295.9, dated Jan. 19, 2017.

Nov. 10, 2017, NZ communication issued for related NZ application No. 714743.

Eurasian Office Action for Application No. 201592098, dated Sep. 28, 2018.

Processing Methods of 'BILDEX' Aluminum Composite Panels (ACP FRM, ACP BDX).

* cited by examiner

US 10,569,366 B2

METHOD AND A PLATE MODULE FOR MANUFACTURING A THERMAL MODIFICATION KILN

TECHNICAL FIELD

The application relates generally to a method for manufacturing a thermal modification kiln.

BACKGROUND

The production of kilns intended for the thermal modification of wood has been traditionally carried out with machine shop methods by ordering steel plates of a given size made in stainless steel and by press-bending the same one at a time in keeping with CAD drawings for the kiln. These plates have then been assembled in the machine shop into a complete thermal modification kiln by means of a beam system, whereby the kiln can be provided with a required strength and pressure resistance, followed by shipping the kiln as a complete unit to the customer.

Due to a large size of the kiln, the transport costs in export deliveries make up a significant part of the investment costs in the case of a long distance transport. Also, many potential export countries have a lot of impediments on the road, such as bridges, traffic signs, and trees, making it difficult, if not even impossible, to transport a large complete kiln.

Because of difficulties in transport, attempts have been made to render the kilns structurally lighter or alternatively to assemble the same from components at a final destination of the kiln. Welding kiln segments together has resulted in the warping of stainless steel with a propensity of distorting structural dimensions and shapes.

Accordingly, it has been found the best practice to complete the kiln structure at a machine shop in such a way that the kiln components are first fastened together—so-called tacked—with short intermittent welds, thereby managing to assemble the entire kiln to its form. The welding together of kiln joints is not started until at this point, whereby the entire kiln is better to retain its shape and the transportation of such a constructed complete kiln is inconvenient and expensive.

SUMMARY

It is one objective of the invention to reduce problems related to the production and transport processes of currently available thermal timber modification kilns.

The one objective of the invention is attained with a method, a plate module, and a thermal modification kiln.

A method according to one embodiment, which is intended for manufacturing a thermal timber modification kiln, comprises constructing plate modules from steel plates by forming the plate edges with flaps that enable adjacent modules to be interconnected for a kiln frame.

In a plate module according to one embodiment, which is intended for manufacturing a thermal timber modification kiln, the edges of a module constructed from a steel plate are formed with flaps that enable adjacent modules to be interconnected for a kiln frame.

In a thermal timber modification kiln according to one embodiment, the kiln frame is manufactured of plate modules, which are constructed from steel plates by forming the plate edges with flaps that enable adjacent modules to be interconnected.

Other embodiments are presented in the dependent claims.

BRIEF DESCRIPTION OF THE FIGURES

The detailed description of the figures will deal with exemplary embodiments of the invention more precisely with reference to the accompanying figures, in which.

DETAILED DESCRIPTION OF THE FIGURES

Figure 1:
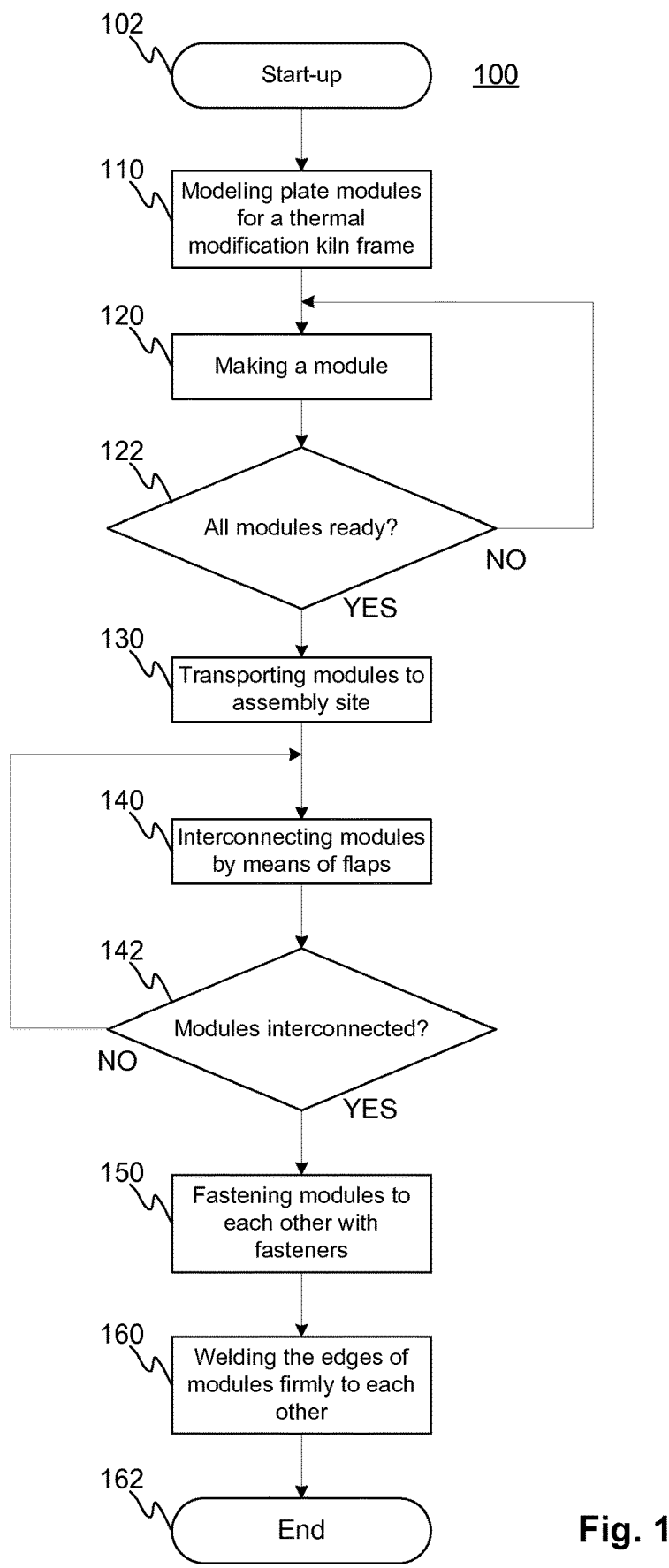
FIG. 1 shows a flowchart for a method of manufacturing a thermal timber modification plant.
Figure 2A:
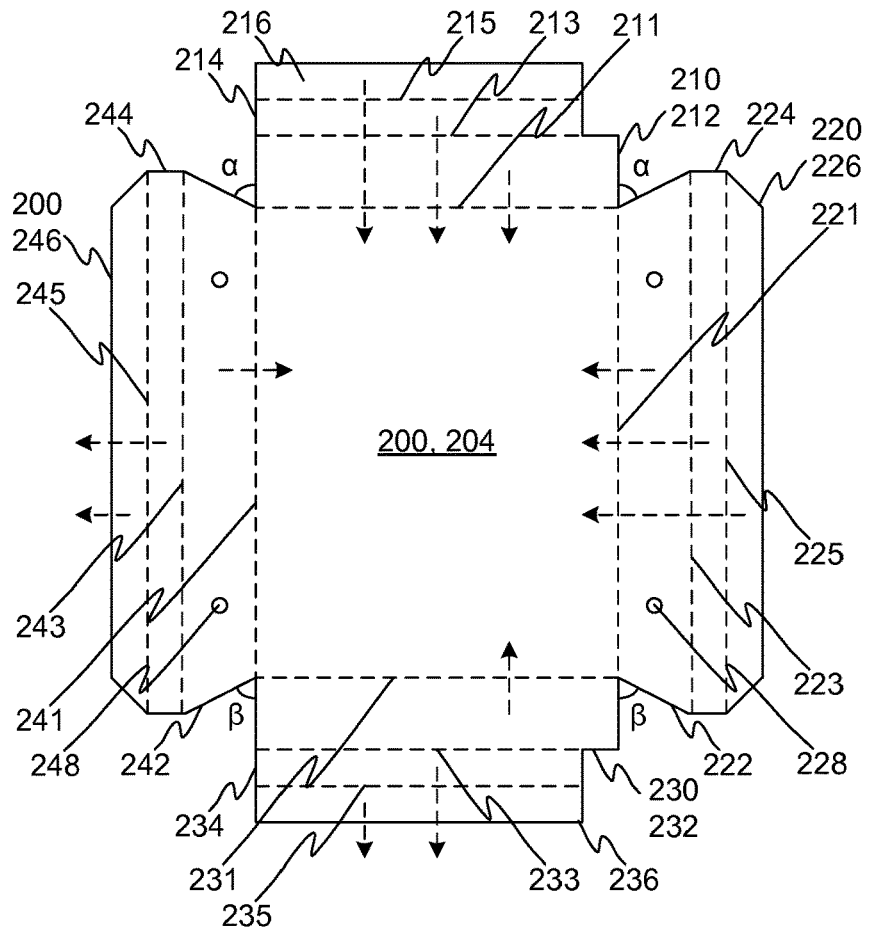
FIGS. 2a-2f show from various perspectives a steel plate cut for folding a plate module, as well as a complete module with folded flaps.
Figure 2B:
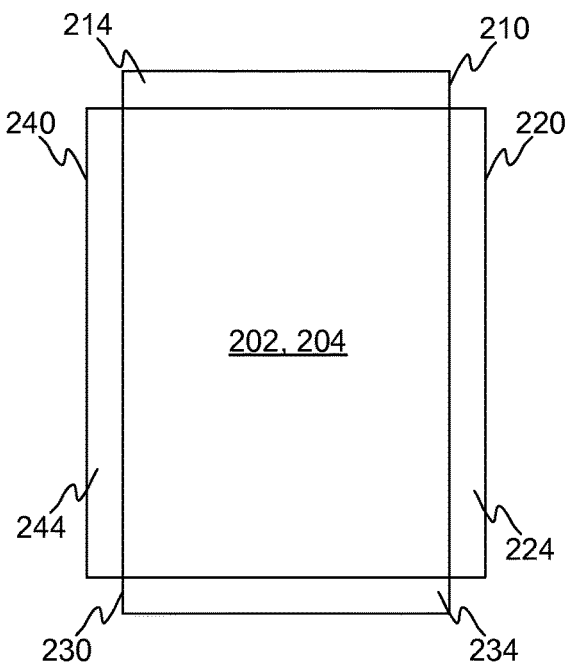
Figure 2C:
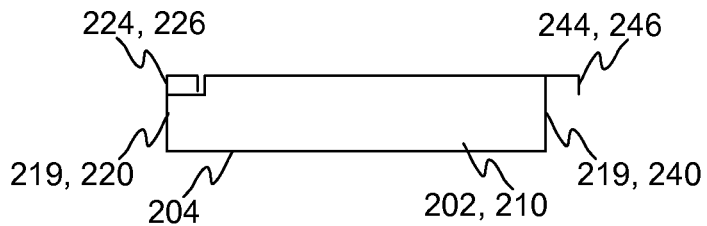
Figure 2D:
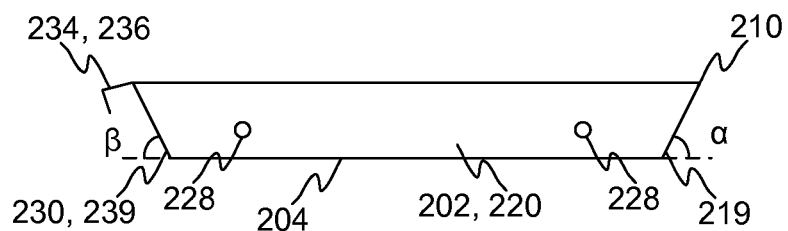
Figure 2E:
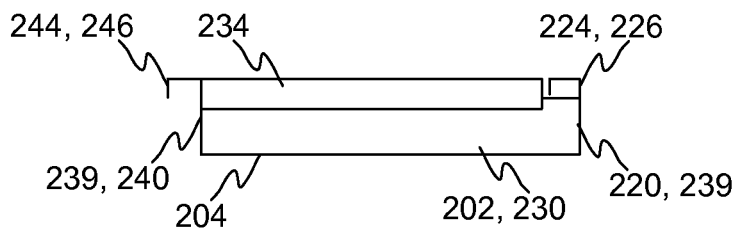
Figure 2F:
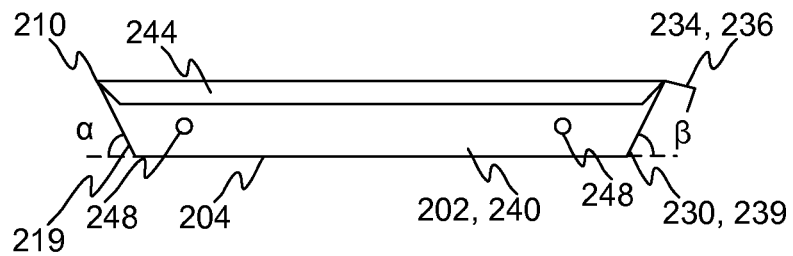
Figure 3A:
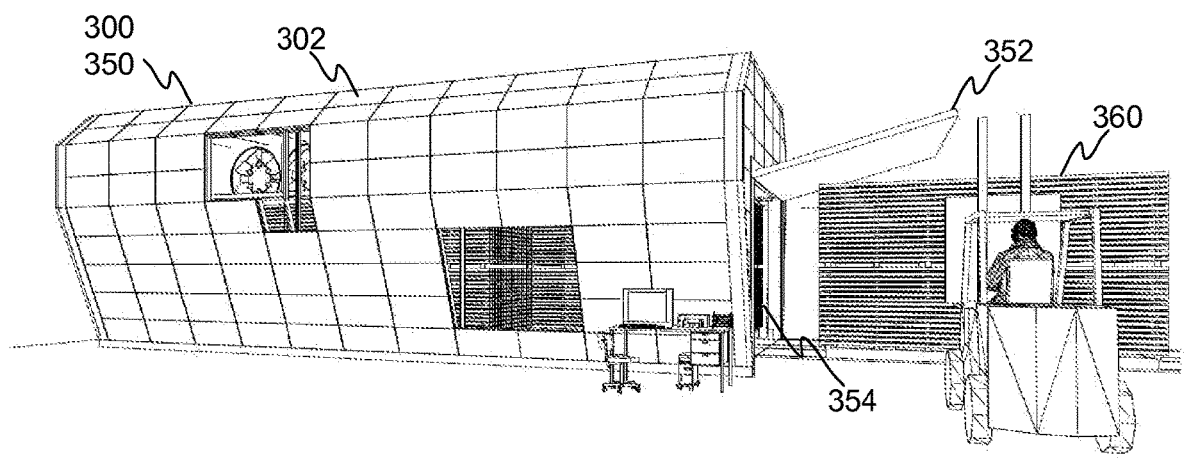
FIGS. 3a-3b show from a side and obliquely from the front a thermal modification plant constructed from plate modules.
Figure 3B:
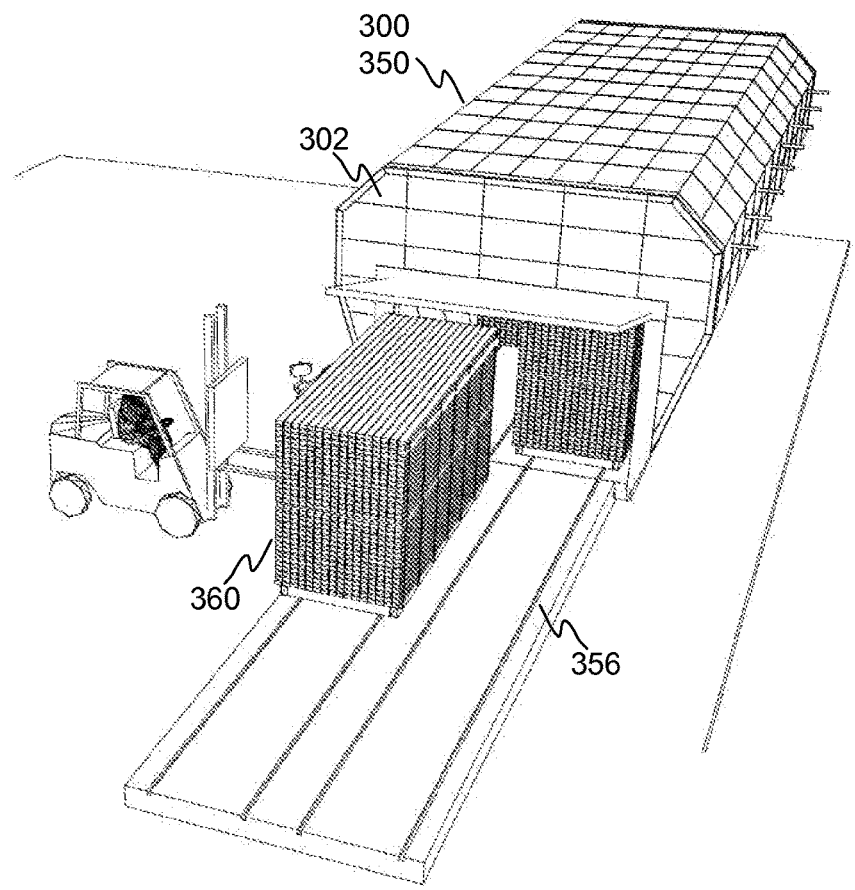

FIG. 1 shows a method 100 for manufacturing a thermal timber modification kiln 300 depicted in FIGS. 3a-3b. A beam frame 350 of the kiln 300 is assembled from plate or installation modules 202, 302 as presented in FIGS. 2a-2f.

In a starting step 102, a message is received from an orderer of the kiln 300 about which size kiln 300 is to be supplied for the orderer's disposal. The ordered kiln 300 can be either of a predetermined standard size, for example 8, 18, 28, 44, 60, 120 or 240 m$^3$ in volume, or it can be customized for the orderer.

The dimensional data obtained in step 110 is used as a basis for modeling the kiln 300 as well as the plate modules 202, 302 employed for its fabrication. The modules 202, 302 have an unvarying shape regardless of the size of the kiln 300, it being only the surface area, i.e. the length and/or width, of the modules 202, 302 and/or angles α, β for the folded end edges of the module 202, 302 which are variable, depending on a size of the kiln 300 to be manufactured and on a location of the module 202, 302 in the frame 350.

Making use of 3D modeling, as well as computational fluid dynamics and optimization, makes it possible to manufacture a kiln structure 300, which is to be constructed from structurally unvarying modules 202, 302 and which is economically attractive to manufacture, possible to transport in parts with just one shipping container, thus reducing the required transport space, and possible not to be assembled until on site in the customer's building, enabling the assembly work to be carried out cost-effectively and to a high standard.

Step 120 comprises automated manufacturing of the module 202, 302 for example from a stainless steel plate 200 with a machine according to design. Alternatively, the plate 200 can be for example a coated sheet of steel or aluminum or a duplex plate. FIG. 2a shows a plan view of the plate 200, which has been cut to a desired size and shape.

In the method 100, the modules 202, 302 can be manufactured in a cost-effective and dimensionally precise manner by making use of modern automated machines, for example sheet metal and laser workstations. The utilization of machine automation in manufacturing lowers manufacturing costs significantly and, above all, the dimensionally precise parts enable the assembly to be carried out on installation site.

The die-cut stainless steel plate 200 comprises a panel section 204, end edges 210, 230, and side edges 220, 240. The plate 200 has its edges 210, 220, 230, 240 formed, as denoted by dashed lines in FIG. 2a, with flaps 211, 213, 215, 221, 223, 225, 231, 233, 235, 241, 243, 245 fitting together with those 211, 213, 215, 221, 223, 225, 231, 233, 235, 241, 243, 245 of other modules 202, 302 and enabling the adjacent modules 202, 302 to be interconnected for constructing the frame 350.

The flaps 211, 213, 215, 221, 223, 225, 231, 233, 235, 241, 243, 245 are formed at either one or more edges 210, 220, 230, 240 at a time, such that first folded inwards along the dashed lines 211, 221, 231, 241 is an end/side section 212, 222, 232, 242 in such a way that the side section 222, 242 presents the flaps 221, 241 for example at a substantially 90° angle with the panel section 204. Respectively, the end sections 212, 232 are folded inwards at the flaps 211, 231 in such a way that the sections 212, 232 are for example consistent with angles α, β established by the sections 222, 242, and the angle of the flaps 211, 231 is α, β. The angles α, β can be equal or unequal, depending on a location of the to-be-manufactured module 202, 302 in the frame 350. Likewise, the angles α, β have their size depending on the size of the kiln.

Next folded inwards along the dashed lines 213, 223 are overlays 214, 224 for the sections 212, 222 so as to lie for example substantially parallel to the panel 204 and, respectively, overlays 234, 244 outwards along the dashed lines 233, 243 for the sections 232, 242, such that at least one or both of the overlays 234, 244 can be for example substantially parallel to the panel 204, i.e. substantially perpendicular to the edge 230, 240, or at least one or both of them can be at some angle relative to the edge 230, 240 as required by the frame structure.

Finally folded inwards along the dashed lines 215, 225 are lips 216, 226, such that the lips 216, 226 are for example substantially perpendicular to the panel 204 as well as to the overlay 214, 224 and, respectively, lips 236, 246 outwards along the dashed lines 235, 245, such that the lips 236, 246 are for example substantially perpendicular, i.e. at a substantially 90° angle, to the overlay 234, 244 or in such a way that the lips 236, 246 are parallel to the sections 232, 242.

It is also possible that the flaps 211, 213, 215, 221, 223, 225, 231, 233, 235, 241, 243, 245 be formed in an order other than described above, for example in reverse order.

Alternatively, in the process of manufacturing for example corner modules 202, 302 for the kiln 300, it is possible that one or more of the edges 210, 220, 230, 240 of the module 202, 302 not be folded at all.

Alternatively, if it is desirable to strengthen the edges 210, 220, 230, 240, the flap fold 211, 213, 215, 221, 223, 225, 231, 233, 235, 241, 243, 245 is made as a single unit in such a way that for example the lip 246 visible in FIG. 2c is folded with two additional flaps perpendicularly against a bottom surface of the overlay 244. Alternatively, more strength is obtained by widening the size (surface area) of the overlays 214, 224, 234, 244 and the lips 216, 226, 236, 246.

The manufacturing process of the module 202, 302 further comprises providing the edges 210, 220, 230, 240 of the module 202, 302 with at least one penetration 228, 248 intended for fasteners that are used for locking the modules 202, 302 to each other prior to a final unification by welding. Moreover, in case a particular module 202, 302 is intended to include other penetrations 228, 248, a penetration shall be provided for at least one of the following devices of the kiln 300: at least one fan, at least one temperature sensor, at least one sensor measuring the temperature of timber to be dried, at least one moisture sensor, at least one heating radiator, at least one steam pipe, at least one water pipe, and at least one ventilation pipe.

FIG. 2b shows in a plan view a complete module 202, 302 with folded flaps, which is used for constructing a thermal modification kiln 300 for timber. The module 202, 302 made from a steel plate 200 has its edges 210, 220, 230, 240 formed with flaps 211, 213, 215, 221, 223, 225, 231, 233, 235, 241, 243, 245 that enable the adjacent modules 202, 302 to be interconnected for constructing a beam frame 350 for the kiln 300. The beam systems made up by the edges 210, 220, 230, 240 constitute a load-bearing structure for the kiln 300 together with the panel section 204 of the modules 202, 302. Clearly visible in the figure are the inwardly folded overlays 214, 224 of the edges 210, 220 and the outwardly folded overlays 234, 244 of the edges 230, 240.

In a module 202, 302 according to one embodiment, the folded edges 210, 220, 230, 240, for example the sections 222, 242, are provided with penetrations 228, 248 intended for fasteners. In addition, at least one penetration 228, 248 can be provided, as opposed to FIG. 2a, also in the end edges 210, 230 and/or in the panel 204.

In a kiln 300 according to one embodiment, which has been constructed from modules 202, 302, the modules 202, 302 have the edges 210, 220, 230, 240 thereof provided with penetrations 228, 248 intended for fasteners.

The completed module 202, 302 with folded flaps is further shown in FIG. 2c from a direction of the edge 210, in FIG. 2d from a direction of the edge 220, in FIG. 2e from a direction of the edge 230, and in FIG. 2f from a direction of the edge 240.

If, in step 122, there are still modules 202, 302 to be made, the method 100 returns back to the fabrication step 120.

On the other hand, if all modules 202, 302 for the kiln 300 are ready to use, the modules 202, 302 are transported in step 130 to an assembly site of the kiln 300.

An advantage of the method 100 is to enable a transport of the kiln 300 in parts to its final destination and not having to make a final assembly of the kiln 300 until on a working site at the orderer's. Hence, the modules 202, 302 can be installed by using local labor, and the working steps of the method 100 can be carried out each time wherever most prudent.

In step 140, the modules 202, 302 are interconnected at the assembly site in such a way that the flaps 211, 213, 215, 221, 223, 225, 231, 233, 235, 241, 243, 245 at the edges 210, 220, 230, 240 of adjacent modules 202, 302 are fitted to each other and the penetrations 228, 248 present in the folded edges 220, 240 of the interconnected adjacent modules 202, 302 are set in alignment with each other.

In the process of connecting the modules 202, 302 to each other, there is a possibility of using bracing pieces, for example a flexed bracing plate conforming to the folded edges 210, 220, 230, 240 and being fitted between the flaps of the modules 202, 302. The bracing plate can be made from the same material as the modules 202, 302, for example from stainless steel, a coated sheet of steel or aluminum, or a duplex plate. Optionally, the bracing piece may comprise a pipe beam, which is placed in an inner flap 211, 213, 215, 221, 223, 225, 231, 233, 235, 241, 243, 245 at the edges 210, 220, 230, 240 of that particular module 202, 302 whose flaps 211, 213, 215, 221, 223, 225, 231, 233, 235, 241, 243, 245 are left in the lowermost position as the modules 202, 302 are connected. The bracing pieces make it possible to increase the strength and durability of the frame 350.

In a module 202, 302 according to one embodiment, the die-cut edges 210, 220, 230, 240 of a plate 200 are folded in such a way that the flaps 211, 213, 215, 221, 223, 225, 231, 233, 235, 241, 243, 245 fit in those 211, 213, 215, 221, 223, 225, 231, 233, 235, 241, 243, 245 of other modules 202, 302 in a manner that the edge 230 is capable of being laid on top of the edge 210 and the edge 240 respectively on top of the edge 220.

In a kiln 300 according to one embodiment, which has been constructed from modules 202, 302, the modules 202, 302 have the edges 210, 220, 230, 240 thereof die-cut and folded in such a way that the flaps 211, 213, 215, 221, 223, 225, 231, 233, 235, 241, 243, 245 fit in those 211, 213, 215, 221, 223, 225, 231, 233, 235, 241, 243, 245 of other modules 202, 302.

In a kiln 300 according to one embodiment, which has been constructed from modules 202, 302, the modules 202, 302 are interconnected in such a way that the flaps 211, 213, 215, 221, 223, 225, 231, 233, 235, 241, 243, 245 at the edges 210, 220, 230, 240 of adjacent modules 202, 302 are fitted in each other and the penetrations present in the folded edges 210, 220, 230, 240 of the interconnected adjacent modules 202, 302 are set in alignment with each other.

If, in step 142, more modules 202, 302 still need to be interconnected and/or fitted to each other, the method 100 returns back to step 140.

On the other hand, if the modules 202, 302 have been interconnected in a desired manner, the interconnected adjacent modules 202, 302 are attached instep 150 with fasteners capable of being fitted in the penetrations 228, 248. The modules 202, 302, which have been initially attached with fasteners, remain fixed in position without welding, whereby the frame 350 can be assembled completely by means of the fasteners prior to a final attachment of the modules 202, 302 to each other by welding.

Alternatively, the modules 202, 302 can be attached in such a way that adjacent modules 202, 302 are interconnected by means of the flaps 211, 213, 215, 221, 223, 225, 231, 233, 235, 241, 243, 245 and are one by one attached with fasteners to each other prior to connecting the next modules 202, 302.

The useful fasteners may include at least one of the following fastener types: a pop rivet (blind rivet), a traditional T rivet, a rivet nut, a rivet bolt, a screw/nut combination, and an anchor bolt.

Alternatively, the initial attachment of modules 202, 302 in step 150 can be implemented with welding tongs or the like fasteners, which do not require penetrations 228, 248, or by spot or seam welding.

In a kiln 300 according to one embodiment, which has been constructed from modules 202, 302, the interconnected modules 202, 302 are attached with fasteners capable of being fitted in the penetrations 228, 248.

Step 160 comprises welding firmly to each other the edges 210, 220, 230, 240 of modules 202, 302, initially attached with fasteners, for constructing an airtight beam frame 350. The long welding joints, which are needed for providing a tight internal surface for the kiln 300, are made for example on the corners established by the flaps 211, 221, 231, 241 and the panel section 204 of the modules 202, 302. Hence, those surfaces, being for example at 90° degree angles with each other, i.e. the panel sections 204 as well as the edges 210, 220, 230, 240, preclude dimensional changes of the modules 202, 302 even though the modules 202, 302 are attached to each other with long welding joints. The modules 202, 302 retain unchanged outer dimensions as opposed to traditional manufacturing, in which the outermost edges of metal sheets are distorted as a result of residual welding stresses.

The welding sequence for the modules 202, 302 and/or the edges 210, 220, 230, 240 does not matter by virtue of the initial fastening and the welding process being performed on the corner of the flap 211, 221, 231, 241. The kiln structure 300, assembled from dimensionally precise modules 202, 302, turns out to become sufficiently tight to withstand the pressure generated by fans and filters of the kiln 300.

In addition, it is possible to produce a welding joint on a corner 219, 239 made up by sections 212, 222, 232, 242 of the edges 210, 220, 230, 240 of modules 202, 302 and/or to weld at least one set of overlays 214, 224, 234, 244 of the interconnected modules 202, 302 firmly to each other from outside the frame 350.

When the edges 210, 220, 230, 240 of modules 202, 302 are welded, for example at the flaps 211, 221, 231, 241 and at the corners 219, 239, firmly to each other, the modules 202, 302 retain unchanged outer dimensions and straight surfaces for connecting to the next modules 202, 302 - i.e. the modules 202, 302 do not undergo deformations—and the assembly of the kiln 300 is facilitated.

In addition, the sections 212, 222, 232, 242 constitute a "root backing" for weld joints, thus enabling the use of a thinner plate 200 in manufacturing the kiln 300 and reducing the manufacturing costs of the kiln 300 for this reason as well.

In a kiln according to one embodiment, which has been constructed from modules 202, 302, the edges 210, 220, 230, 240 of the adjacent fastener-attached modules 202, 302 have been welded firmly to each other for producing an airtight beam frame 350.

By virtue of the modules 202, 302, the kiln 300 does not require the use of an expensive beam structure, because in a preferred construction made up by modules 202, 302, the edges 210, 220, 230, 240 in and of themselves constitute a robust "beam support structure" for the kiln 300.

Putting together a modular beam frame 350 for the kiln 300 takes time on average about one minute per module 202, 302, the initial fastening of the frame 350 being therefore achievable in about 24 hours. The final fastening of the frame 350 by welding takes about one week, whereby the time gained over current assembly modes is at least in the order of two months, which represents not only time saving but also saving in costs since putting together the frame 350 only requires workforce for just over a week at the assembly site.

In step 162, the method 100 comes to an end.

FIGS. 3a-3b illustrates a kiln 300, its beam frame 350, consisting of modules 202, 302, comprising a doorway 354, which is equipped with a door 352 and whereby timber stacks 260 to be thermally modified are passed into and out of the kiln 300 by means of a transfer line 356. Clearly visible in FIG. 3b is the shape of the kiln 300 with the frame 350 being narrower at its lower part than at its upper part. This particular shape of the frame 350 is possible to implement by virtue of the modules.

The above presentation only shows a few exemplary embodiments of the invention. The principle according to the invention can naturally be varied within the scope of protection defined by the claims, regarding for example implementation details and fields of use.

The invention claimed is:

1. A method for manufacturing a thermal timber modification kiln, the method comprising:
    making plate modules from steel plates, the modules comprising
        a panel, and
        edges comprising
            end and side sections,
            first flaps between the panel and the end and side sections, and overlays,
the first flaps between the panel and the end and side sections being formed such that the end and side sections are folded inwards, towards the panel, such that the folded sections present the first flaps at an angle with the panel,
forming second flaps between the end and side sections and the overlays such that a first set of the overlays is folded outwards, away from the panel, and a second set of the overlays is folded inwards, towards the panel, in such a way that the folded overlays are substantially parallel to the panel and present the second flaps at an angle with the end and side sections,
wherein the first and second flaps and the outwardly- and inwardly-folded end and side sections enable adjacent modules to be interconnected at any of the edges without using additional beam structures, for constructing a kiln frame, and
the adjacent modules are interconnected such that the folded edges of the adjacent modules are fitted in each other.

2. A thermal timber modification kiln which is manufactured by the method according to claim 1, the kiln comprising:
a frame consisting of plate modules, each module comprising
a panel, and
edges comprising
end and side sections,
first flaps between the panel and the end and side sections, and
overlays,
wherein the end and side sections are folded inwards, towards the panel, such that the folded sections present the first flaps at an angle with the panel,
a first set of the overlays is folded outwards, away from the panel, and a second set of the overlays is folded inwards, towards the panel, in such a way that the folded overlays are substantially parallel to the panel and present second flaps at an angle with the end and side sections,
the first and second flaps and the outwardly- and inwardly-folded end and side sections enable adjacent modules to be interconnected at any of the edges without using additional beam structures, for constructing a kiln frame, and
the adjacent modules are interconnected such that the folded edges of the adjacent modules are fitted in each other.

3. A plate module for manufacturing a thermal timber modification kiln, said module being made by the method according to claim 1, the plate module comprising:
a panel section; and
edges comprising
end and side sections,
first flaps between the panel and the end and side sections, and
overlays,
wherein the sections are folded inwards, towards the panel, such that the folded sections present the first flaps at an angle with the panel,
a first set of the overlays is folded outwards, away from the panel, and a second set of the overlays is folded inwards, towards the panel, in such a way that the folded overlays are substantially parallel to the panel and present second flaps at an angle with the end and side sections,
the first and second flaps, and the outwardly- and inwardly-folded end and side sections enable adjacent modules to be interconnected at any of the edges without using additional beam structures, for constructing a kiln frame, and
the adjacent modules are interconnected such that the folded edges of the adjacent modules are fitted in each other.

4. The method according to claim 3, wherein the making of modules comprises cutting the plates to a desired shape and forming die-cut edges of the plates with flaps which fit in flaps at the edges of other modules.

5. The method according to claim 3, wherein the making of modules further comprises forming the folded edges with penetrations configured for fasteners.

6. The method according to claim 5, further comprising interconnecting the modules such that the penetrations present in the edges of the interconnected adjacent modules are set in alignment with each other.

7. The method according to claim 6, further comprising fastening the interconnected modules with fasteners configured to be fit in the penetrations.

8. The method according to claim 7, further comprising welding the edges of adjacent fastener-secured modules firmly to each other to construct an airtight kiln frame.

9. The method according to claim 4, wherein the making of modules further comprises forming the folded edges with penetrations configured for fasteners.

10. The method according to claim 9, further comprising interconnecting the modules such that the penetrations present in the edges of the interconnected adjacent modules are set in alignment with each other.

11. The method according to claim 10, further comprising fastening the interconnected modules with fasteners configured to be fit in the penetrations.

12. The method according to claim 11, further comprising welding the edges of adjacent fastener-secured modules firmly to each other to construct an airtight kiln frame.

* * * * *